May 5, 1959 G. F. CEROFOLINI 2,885,478

LOUDSPEAKING TELEPHONE EMPLOYING TRANSISTORS

Filed March 20, 1957 4 Sheets-Sheet 1

INVENTOR.
GABRIELE F. CEROFOLINI

BY C. A. Gulbrandsen

ATTY.

LOUDSPEAKING TELEPHONE EMPLOYING TRANSISTORS

Filed March 20, 1957 4 Sheets-Sheet 2

INVENTOR.
GABRIELE F. CEROFOLINI
BY
C. A. Gulbrandsen
ATTY.

INVENTOR.
GABRIELE F. CEROFOLINI
BY
C. A. Gulbrandsen
ATTY.

INVENTOR.
GABRIELE F. CEROFOLINI
BY
C. A. Gulbrandsen
ATTY.

United States Patent Office 2,885,478
Patented May 5, 1959

2,885,478

LOUDSPEAKING TELEPHONE EMPLOYING TRANSISTORS

Gabriele F. Cerofolini, Milan, Italy, assignor to General Telephone Laboratories, Incorporated, Chicago, Ill., a corporation of Delaware Application March 20, 1957, Serial No. 647,421

11 Claims. (Cl. 179—1)

The invention relates to telephone systems and, more particularly, to loudspeaking telephone systems. More specifically, the invention addresses itself to systems of this kind, hereinafter referred to as "selective" loudspeaking systems, which are arranged both for "distant-talking" by means of a microphone and loudspeaker and for regular or "close-range" communication by means of a handset.

Present-day loudspeaking telephone systems generally employ as a means of amplification vacuum tubes which are powered from the commercial alternating current network. While these loudspeaking systems are fully satisfactory in operation they require relatively bulky equipment. Previously proposed selective loudspeaking systems of this kind consist of at least three equipment units, namely a subset which houses, in addition to the regular subset components, one of the distant-talking transducers; a cabinet which houses the other distant-talking transducer; and a steel cabinet housing the remaining equipment needed for loudspeaking operation. This last-mentioned equipment includes a hybrid transformer, two vacuum tube amplifiers, one for the microphone and the other for the speaker, the rather voluminous power supply equipment for these amplifiers and a push-button operated relay for turning the power supply on or off and for performing the remaining switching functions required to transfer the system from one to the other type of operation.

Because of its considerable size and weight the steel cabinet must be bolted to the underside of the subscriber's desk or to some other out-of-the-way supporting surface; moreover, the numerous interconnections required call for a comparatively heavy cable between the cabinet and the subset. These factors make it difficult to move the loudspeaking apparatus from place to place. Furthermore, a prerequisite for the operation of a system of this kind is that a commercial power network is available at the location in question and that there is no power failure at the time the loudspeaking facilities are needed, such as in the case of an urgent conference.

In copending United States patent application Serial No. 634,184, filed by R. T. Cleary, R. F. Huckstadt and R. V. Burns on January 15, 1957, a selective loudspeaking telephone system has been proposed in which the foregoing drawbacks are avoided. In this previously proposed loudspeaking systems the amplifiers used to provide loudspeaking operation are transistor amplifiers which are supplied with the necessary bias voltages from the central office battery over the line to which the loudspeaking apparatus is connected. One of the these amplifiers, namely the microphone amplifier, is mounted on a plug-in type circuit card in the subset and the microphone itself also is mounted in the subset. The other amplifier, the speaker amplifier, is mounted in a separate cabinet which also houses the loudspeaker. Switching from handset operation to loudspeaking operation or back is effected at the contacts of a turn key and also at the hookswitch contacts. More particularly, if the system happens to be conditioned for loudspeaking operation and the subscriber prefers to continue the call in question by means of his handset, he must perform two manipulations, namely first lift the handset from the cradle and then return the turn key to its normal position.

The present invention seeks to improve on the arrangement according to the Cleary et al. application. Thus, it is one of the objects of the present invention to simplify the last-mentioned switching-back operation and, more particularly, make transfer-back to close-range talking possible by the mere removal of the handset.

Another object of the invention resides in the provision of a novel arrangement which facilitates mounting both amplifiers in the subset itself.

Yet another object of the invention consists in an improved arrangement for coupling the two amplifiers to the subscriber line.

According to one feature of the invention switching from one type of operation to the other is controlled by two keys or buttons, an "on" button and an "off" button which are mechanically interlocked not only with each other but also with the hookswitch. In this manner the system may be automatically switched from distant-talking to close-range talking by the mere removal of the handset and without the aid of auxiliary switching equipment. In the prior art systems using vacuum tubes such as automatic switching operation required the provision of a relay which, upon operation, closed a locking circuit for itself, the operating current for this relay being derived from the commercial power supply.

According to another feature of the invention, both the microphone amplifier and the speaker amplifier, and also the coupling and power supply components common to these two amplifiers, are accommodated on a plug-in type circuit card which is mounted on the base of the subset. The space required for this circuit card is made available by eliminating the ringer and replacing it by a buzzer.

In the aforementioned copending application the power supply equipment for the two amplifiers includes a crystal diode bridge which serves to maintain the bias supply to the transistor amplifiers at always the same polarity regardless of battery reversal at the central office end of the subscriber line. The present arrangement also uses such a rectifier bridge but in accordance with a further feature of the invention the two amplifiers are coupled to the line through the medium of this rectifier bridge not only for the purpose of direct current supply but also from the standpoint of signal current transmission. This is made possible by a filter connected to the output of the rectifier bridge; the filter has a direct current output and an alternating current output and the two amplifiers are connected to the rectifier bridge through these two filter outputs, that is, with respect to bias currents and signal currents respectively. In this manner separate signal-current coupling means between the line and the amplifiers are eliminated.

The invention, both as to its organization and method of operation, together with other objects and features thereof, will best be understood by reference to the following specification taken in connection with the accompanying drawings. In the drawings:

Figs. 1 and 2 combined show the circuit of the loudspeaking telephone according to the invention. More particularly:

Fig. 6A shows these mechanisms in the condition in which they are during handset operation of the system, and Fig. 6B shows the mechanisms in the condition which they assume during loudspeaking operation of the system.

Figures 1, 2, 3:
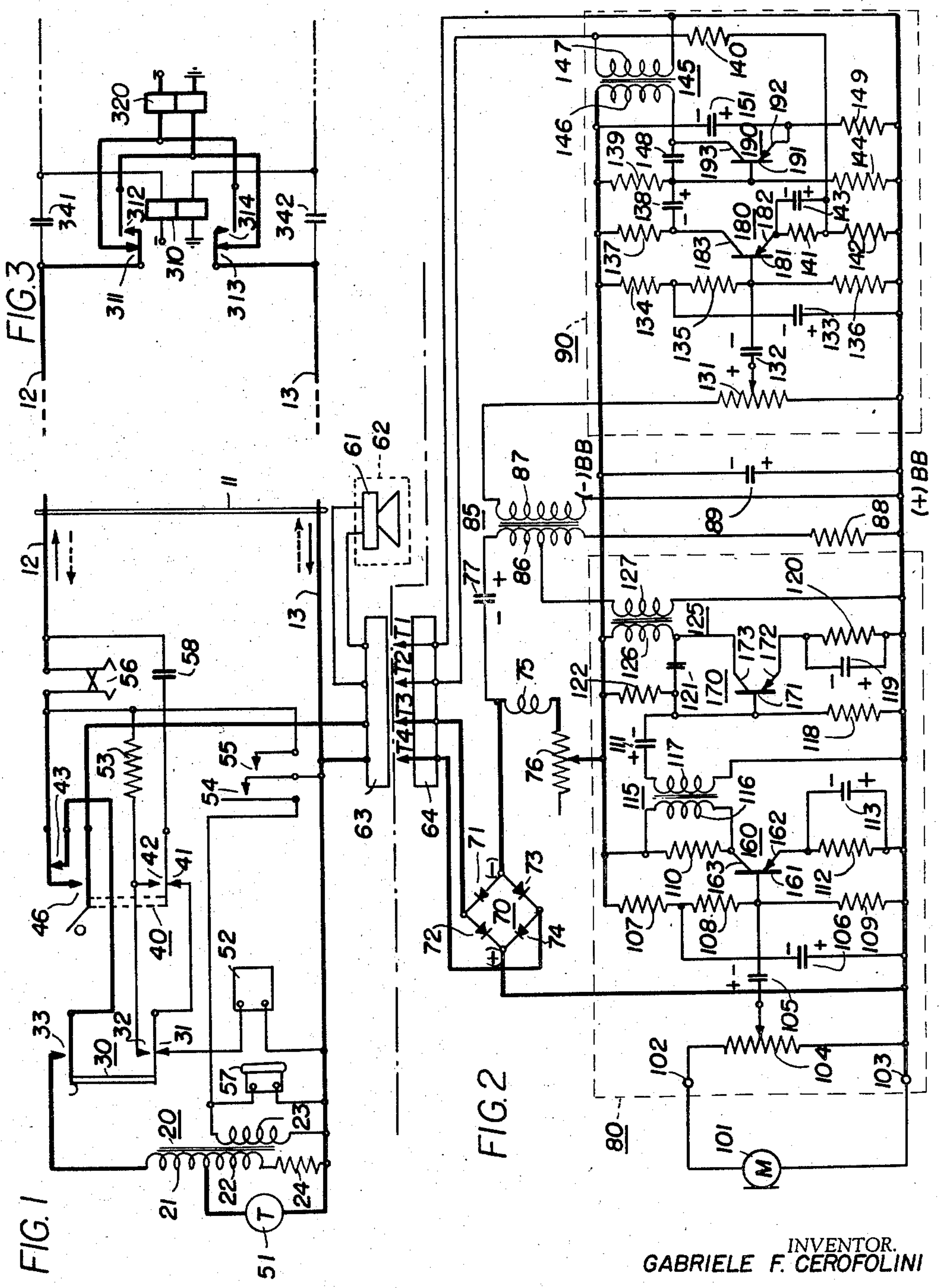
Fig. 1 shows the circuit connections of the subset components which are required for handset operation and for switching from one type of operation to the other, the receptacle receiving the plug-in type circuit card and also the loudspeaker.
Fig. 2 shows the circuit connections of the microphone and of the circuit card mounting the two transistor amplifiers and associated components.
Fig. 3 is a simplified schematic diagram of the transmission equipment in the central office, more particularly the connector switch therein, through which battery is fed to the substation apparatus of Figs. 1 and 2.

Before the operation of the loudspeaking telephone system disclosed herein is explained in detail a brief description will first be given of the apparatus used in the system. Referring first to Figs. 1 and 2 the substation apparatus shown in this circuit diagram consists of only two equipment units, namely the subset itself and a small cabinet, designated 62 in Fig. 1, which houses the loudspeaker. The substation is connected by way of the subscriber line 11 to the central office, part of the central office equipment being shown in Fig. 3. The circuit or circuits shown in heavy lines in Figs. 1 to 3 denote the paths over which the substation, Figs. 1 and 2, is supplied with battery feed from the central office by way of subscriber 11.

As will be seen from Fig. 1, the substation comprises an induction coil or transmission unit 20, a set of switchhook contacts 30, a set of "on-off" control contacts 40 and a dial with the impulse springs 56 and shunt springs 54, 55. Buzzer 52, in connection with ringing condenser 58, serves as a ringing current responsive device for signalling the receipt of an incoming call. Resistor 53 in connection with condenser 58 provides spark protection during dialling. Supported by the cradle of the subset in the usual manner is a handset comprising transmitter 51 and receiver 57.

In Fig. 2 there are diagrammatically shown in addition to microphone 101, the various components of the loudspeaking system which are mounted on the plug-in type circuit card referred to above. This loudspeaking equipment more particularly comprises a microphone or transmitting amplifier 80 including two transistor stages 160 and 170 and a speaker or receiving amplifier 90 which also includes two transistor stages 180 and 190. Reference 64 designates the four-terminal plug by means of which the circuit card is connected with the remainder of the substation circuit. The corresponding receptacle or connector, designated as 63, is shown as a part of Fig. 1.

As will be seen from an inspection of Fig. 2, both amplifiers are coupled to the line by way of plug terminals T3, T4 and diode bridge 70, a filter comprising condensers 77, 89 and choke 75 in conjunction with rheostat 76 being connected to the rectified output of this bridge. Signal current transmission between the line and both amplifiers is effected by way of hybrid coil 85 which is connected to the negative output terminal of the diode bridge by way of condenser 77 and which in conjunction with balancing resistance 88 serves to keep the output of transmitting amplifier 80 from reaching the input of receiving amplifier 90. On the other hand, bus bar —BB from which both amplifiers obtain their negative bias supply is connected to this output terminal of the diode bridge by means of regulating rheostat 76 and choke 75. The positive bus bar +BB which is common to both bias and signal currents, is connected to the positive output terminal of the diode bridge directly and condenser 89 is connected straight across the two bus bars to provide a shunt path for signal currents.

Fig. 3 is a simplified diagram of the transmission bridge in the connector, comprising a calling bridge relay 320 and called bridge relay 310 as well as transmission condensers 341, 342. Called bridge relay 310 operates, in the well-known manner, upon answering of the called subscriber to reverse the direction of the direct current flowing over the calling side of the connection. Diode bridge 70, Fig. 2, serves to maintain the bias supply to transistor amplifiers 80 and 90 at the proper polarity regardless of the aforementioned battery reversal.

Figure 4:
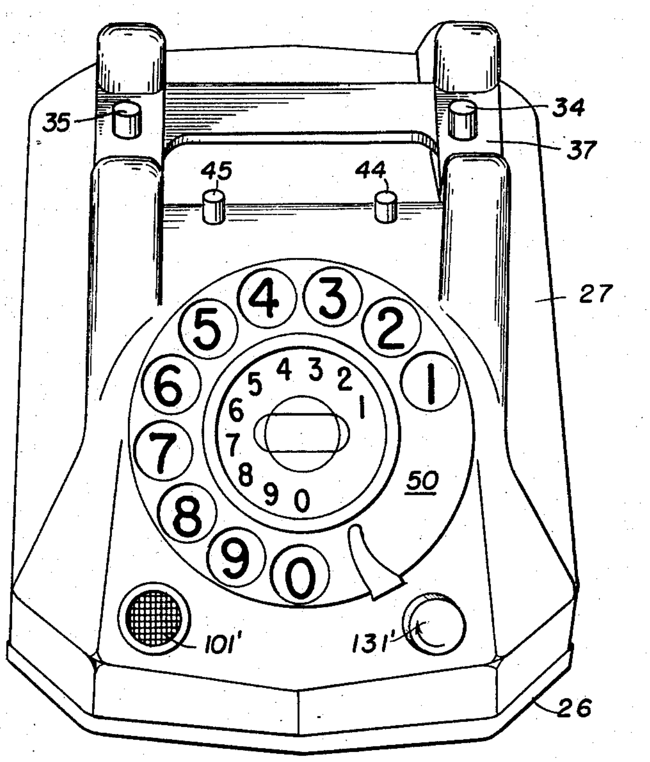
Fig. 4 is an outside view of the subset without the handset.

In the embodiment described herein the subset, Fig. 4, used for the loudspeaking system according to the present invention is of the general design disclosed in United States Patent 2,272,474 to H. F. Obergfell. As shown in Fig. 4, the subset comprises a base 26 and a housing shell 27 having a cradle portion 37; the handset received by this cradle portion has been omitted in Fig. 4. In the instant case the face of housing 27 accommodates, in addition to and underneath the dial 50, a microphone grille 101' and also knob 131' of the gain control potentiometer designated 131 in Figs. 2 and 5, which serves to adjust the speaker volume. Microphone 101 (Fig. 2) itself is mounted on the inside of housing 27 underneath grille 101'. Gain control potentiometer 131, on the other hand, is mounted on the circuit card as more particularly shown in Fig. 5; in the assembled condition of the subset the shaft of this potentiometer extends through an aperture in housing 27 and knob 131' is frictionally attached to the end of this shaft.

Extending through cradle portion 37 of housing 27 are switchhook plungers 34 and 35, the arrangement being such that the associated switchhook mechanism which is mounted within the housing is operated when either or both of these plungers are depressed. In this connection reference is made to the disclosure of the Obergfell patent mentioned above. Mounted immediately in front of cradle portion 37 and also extending through housing 27 are "on"-control button 44 and "off"-control button 45 which serve to switch the substation from handset operation to loudspeaking operation and vice versa. Preferably the two buttons are of different color, for example, button 44 may be white and button 45 red. As will be seen from Fig. 6B, when the system has been conditioned for loudspeaking operation by the depression of "on"-button 44, the last-mentioned button automatically locks in the depressed position so that this white button substantially disappears within the housing whereas the red "off"-button is caused to fully protrude from the outside of the housing. This serves as a clear and simple indication of the fact that the substation is set for loudspeaking operation.

Figure 7:
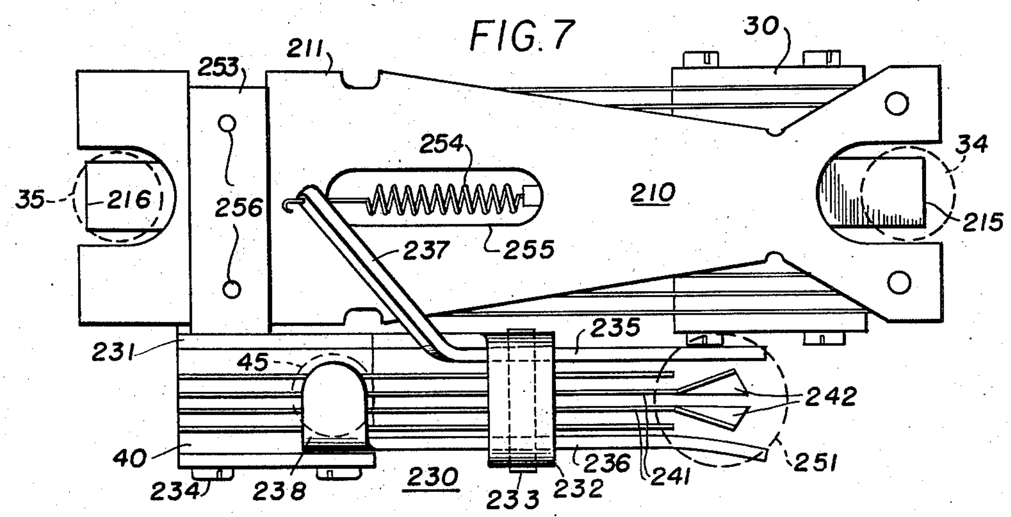
Fig. 7 is a top view of the "on-off" control mechanism and the switchhook mechanism as these two mechanisms appear to an observer looking down from the front of the subset (with the subset housing removed).
Figure 6A:
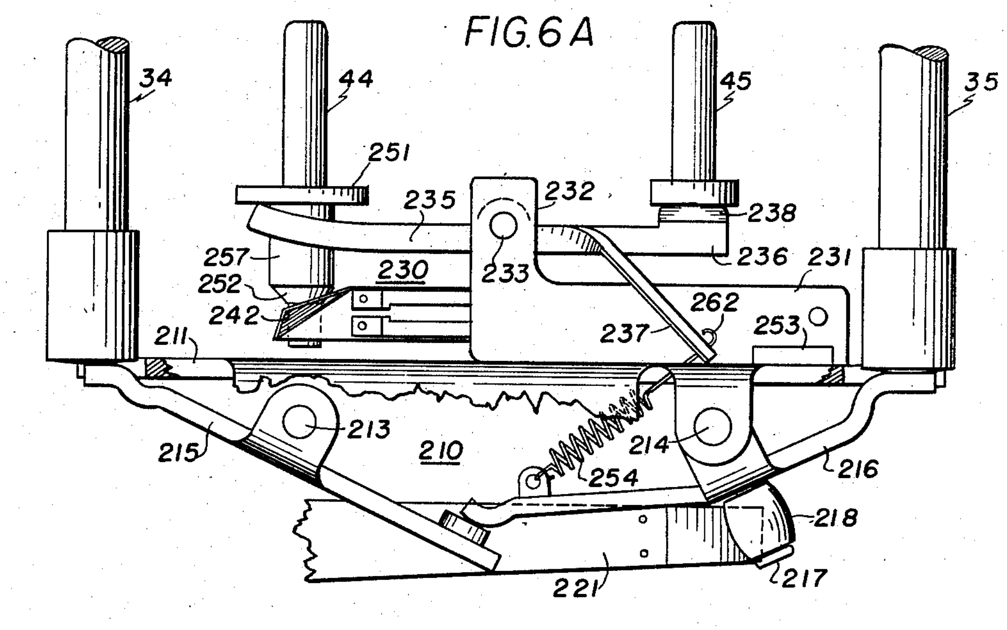
Figs. 6A and 6B are rear views of the "on-off" control mechanism and of the switchhook mechanism which is interlinked therewith.
Figure 6B:
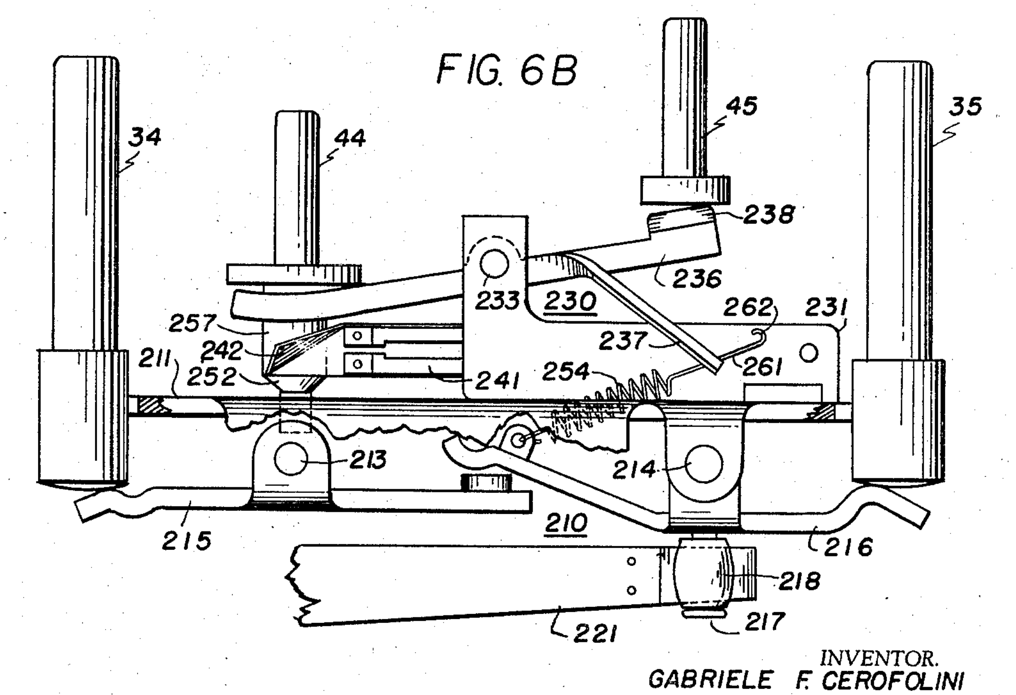

As shown in Figs. 6A, 6B and 7 the switchhook mechanism proper which is collectively designated in these figures by the reference 210, comprises levers 215 and 216 which are pivotally mounted, at 213 and 214 respectively, on the frame 211 of this mechanism and the outer ends of which are respectively engaged by switchhook plungers 34 and 35. Also mounted on frame 211, in a manner more particularly shown in Patent 2,272,474, is switchhook spring assembly 30, Fig. 7. Only one of the two armature or actuating springs, 221, of this assembly has been shown in Figs. 6A and 6B, the free end of this spring being engaged by actuating roller 218 which is mounted on a pin 217 secured to lever 216. With the handset off the cradle the strong spring action of the armature springs, such as 221, of assembly 30 keeps lever 216 in the position shown in Fig. 6A and, with the extreme left end of lever 216 bearing against the extreme right-hand of lever 215, the latter assumes a corresponding position. Both switchhook plungers 34 and 35, therefore, are held in their uppermost position as shown in Fig. 6A. If the handset is now placed on the cradle both plungers 34 and 35 are pressed downward by the weight of the handset against the action of the armature springs so that levers 215 and 216 move onto the position shown in Fig. 6B. In this position roller 218 presses armature spring 221 towards the rear as viewed in Figs. 6A and 6B and switchhook contact assembly 30 as a whole is moved into operated position.

Rigidly secured to frame 211 by means of an extension 253 and screws 256 is another frame 231 which forms the mounting bracket of the "on-off" control mechanism collectively designated 230 in Figs. 6A, 6B and 7. Mounted on frame 231 by means of screws 234 is control contact assembly 40. Frame 231 has a bent-over portion 232 on which two double-arm levers 235 and 236 are pivotally mounted by means of a pin 233; both levers are rigidly secured to pin 233 and hence rock as a unit. The two left-hand ends (as seen in Figs. 6A and 6B) of levers 235 and 236 extend underneath flange 251 of "on"-button 44 on both sides of enlarged cylindrical portion 257 of this button. "Off"- button 45 rests on a bent-over extension 238 at the extreme right end (Figs. 6A and 6B) of lever 236 while lever 235 has a slanted right-hand arm extending downwardly and to the front as viewed in Figs. 6A and 6B; the end of this arm is linked to the left end of lever 216 of switchhook mechanism 210 by means of a helical spring 254 extending through a slot 255 of frame 211. It will be noted particularly from Fig. 6B that spring 254 which is weak compared with the armature springs, such as 221, of the switchhook assembly, has a straight right-hand portion having a hook 262 at its end, the last-mentioned straight portion extending freely through an aperture at the end of arm 237.

Therefore, if the subscriber with switchhook mechanism 210 in its unoperated (off-hook) position shown in Fig. 6A, inadvertently presses "on"-button 44 into its operated (bottom) position against the action of spring 254, control contact assembly 40 will be momentarily operated due to conical portion 252 of button 44 engaging flared portion 242 of the armature springs 241 of this contact assembly. However, as soon as the subscriber releases this button, spring 254 by means of its hook 262 will pull levers 235 and 236, and hence button 44 and control contacts 40, back into their normal position shown in Fig. 6A.

On the other hand, if the switchhook mechanism is in its operated (on-hook) position shown in Fig. 6B, arm 237 remains free of hook 262 even after "on-off" control mechanism 230 has been placed, by depression of button 44, into its operation position illustrated in Fig. 6B. As a result, "on"-button 44 remains locked in its lowermost position, due to the end portion of armature springs 241 clamping cylindrical portion 257 of this button between them, so that the control mechanism 230 as a whole remains in its operated position even though the subscriber removes his finger from the "on" button. As will be clear from Fig. 6B, there are now two alternative ways for restoring control mechanism 230 to its normal position: (1) the subscriber may depress "off"-button 45 which, by engaging bent-over portion 238 of lever 236, forces control mechanism 230 back to normal; (2) the subscriber may lift the handset from the cradle so that switchhook mechanism 210 returns to its normal position shown in Fig. 6A and spring 254 by means of hook 262 pulls arm 237 and hence the whole of control mechanism 230 back to normal. It will be noted that the interlock thus provided between control mechanism 230 and switchhook mechanism 210 is facilitated by the fact that the control mechanism is mounted immediately in front of the switchhook mechanism and generally parallel thereto (Fig. 7).

Figure 5:
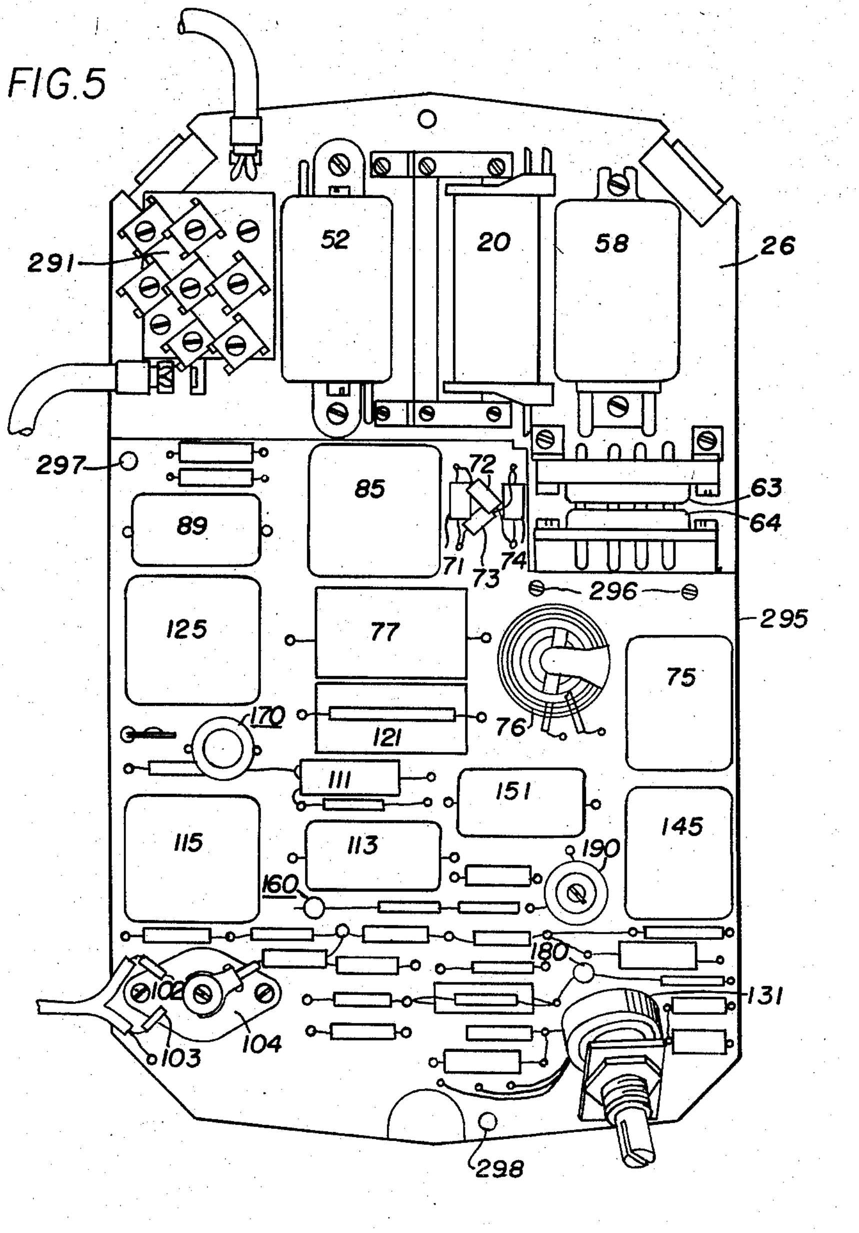
Fig. 5 is a top view of the base of the subset together with the components, including the circuit card, which are mounted thereon.

Fig. 5 which is a top view of the subset base shows in its top portion buzzer 52, induction coil 20, condenser 58, and in addition, terminal block 291 terminating the various connecting cables. Thus, the whole space on base 26 in front of the aforementioned equipment is available to accommodate plug-in type circuit card 295 which is secured to the base by means of screws 297, 298. The various components mounted on circuit card 295 are shown in Fig. 5 with the same reference numerals by which these components are designated in Fig. 2. Attention is particularly invited to plug 64 which is secured to circuit card 295 by screws 296 and which serves to connect the circuit card to the other subset components by way of receptacle 63; gain control potentiometer 131 for adjusting the speaker volume; potentiometer 104 which may be set by the installer for optimum gain of the transmitting amplifier; and rheostat 76 which may likewise be adjusted by the installer to provide the desired bias supply voltage between bus bars —BB and +BB regardless of the length of the subscriber line. 85 is the hybrid transformer, 115 and 125 are the interstage coupling transformer and the output transformer, respectively, of the transmitting amplifier, 145 is the output transformer of the receiving amplifier, 71—74 are the diodes of diode bridge 70, 75 is the filter choke and 77, 89 are the filter condensers. Terminals 102, 103 terminate the cable leading to microphone 101 which is mounted on housing 27.

In now describing the operation of the system let us assume that the subscriber at the substation, Figs. 1 and 2, wishes to make an outgoing call by means of his handset. Upon removal of the handset from the cradle the following loop circuit is closed at contact 33 of the hookswitch assembly: ground, one winding of the line relay of the line switch, not shown, in the central office, line conductor 13, transmitter 51, and in parallel therewith induction coil winding 22 and resistance 24, induction coil winding 21, contacts 33, 43 and 56, line conductor 12, the other winding of the line relay in the line switch, not shown, in the central office, battery. The line switch is caused to search for an idle selector in the well-known manner, whereupon transmission battery feed is transferred from the line relay in the line switch to the line relay in the selector, not shown, and dial tone is returned over line 11 in the usual manner.

When the calling subscriber now dials the first digit the corresponding interruptions of the loop circuit at dial impulse contact 56 cause the selector to be set on the level terminating the desired group of connector trunks. Condenser 58 and resistance 53 which has been connected up at contact 32 upon removal of the handset, furnish spark suppression during dialling. Shunt springs 54, 55 close on this and any following actuations of the dial. At contact 54 a short-circuit is placed across receiver 57 and at contact 55 across the whole of the transmission equipment of the substation. Assuming that the connector partially shown in Fig. 3 is the one seized by the selector, battery feed is now transferred to line relay 320 of the connector, namely by way of contacts 311 and 313. The polarity of the transmission bridge in the connector is the same at this time as was that of the transmission bridge in the line switch and in the selector, that is, the direct current flowing over the loop circuit has the direction indicated by the full line-arrows in Fig. 1.

After the connector, in response to the final digits dialled, has been positioned on the called subscriber line (not shown) and ringing current projected over this line, the called party answers the call and as a result back bridge relay 310 in the connector operates over the called subscriber's loop in the well-known manner. At its contacts 311, 312 and 313, 314 relay 310 reverses the polarity of the loop circuit extending over calling line 11, for instance, for purposes of metering or supervision. Thus the direct current flowing over conductors 12, 13 of the calling subscriber line now assumes the direction indicated by the broken arrows in Fig. 1.

The talking path between the calling and called subscribers is now switched through by way of condensers 341, 342 in a manner well known in the art and the conversation between the two subscribers may begin. Considering first the outgoing speech channel, voice currents generated by transmitter 51 follow a path including line conductor 13, transmitter 51, winding 21, contacts 33, 43 and 56 and line conductor 12, this path being further completed via the switching equipment in the central office all the way to the called substation (not shown). In addition a local branch path is provided for these voice currents which extends from the upper terminal of transmitter 51 through anti-sidetone winding 22 of the induction coil and balancing resistance 24 to the lower terminal of the transmitter, Fig. 1. Under conditions of perfect balance signal voltages induced in secondary winding 23 from line winding 21 are compensated for by opposed signal voltages induced in winding 23 from anti-sidetone winding 22 so that no signal voltages originating from the local transmitter are impressed on receiver 57. In this manner sidetone effects are largely suppressed.

Voice currents incoming over subscriber line 11 and traversing windings 21 and 22 of induction coil 20 in series induce signal voltages in secondary winding 23 which are impressed on receiver 57. At the end of the conversation the calling subscriber replaces the handset, thereby opening the loop circuit at contact 33 and hence releasing the central office equipment in a well-known manner.

If the subscriber at the substation, Figs. 1 and 2, wishes to make an outgoing call by means of microphone 101 and loudspeaker 61 in lieu of the handset, he depresses the white "on"-button 44, whereby control contact assembly 40 is operated. Moreover, due to the fact that the handset is in place on the cradle "on"-button 44 is permitted to lock in operated position, as shown in Fig. 6B and explained in the above description of this figure. At contacts 41, 42 condenser 58 is transferred from buzzer 52 to resistance 53 to close a spark squenching circuit across dial impulse springs 56. Moreover, at make-before-break contacts 46, 43 line conductor 12, in series with the dial impulse springs, is transferred from the transmission equipment, Fig. 1, serving for handset operation to the transmission equipment and power supply apparatus, Fig. 2, which are used in conjunction with the loud-speaking operation of the system. The direct current line circuit closed under this condition may be traced as follows: ground, one winding of the line relay in the line circuit, not shown, in the central office, line conductor 13, plug terminal T4, crystal diode bridge 70, plug terminal T3, contacts 46 and 56, line conductor 12, the other winding of the line relay in the line circuit, not shown, in the central office, battery.

In order to set up a connection to the called party the calling subscriber now actuates his dial just as described above for a handset-initiated call. On each actuation of the calling device the dial shunt springs close so that at contact 55 a short-circuit is placed, by way of contact 46 across plug terminals T3, T4 whereby the whole of the loudspeaking equipment, Fig. 2, is shorted out.

It will be appreciated that with the line circuit last described having the direction indicated by the full-line arrows, Fig. 1, which direction prevails, for example, during the receipt of dial tone from the selector, diodes 74, 71 of diode bridge 70 conduct, thereby causing a positive potential to be developed on the left-hand terminal and a negative potential on the right-hand terminal of this bridge as viewed in Fig. 2. These are the potentials required to supply both transistor amplifiers with the proper operating voltages. When the called subscriber, upon completion of the connection, answers the call back bridge relay 310, in operating, causes the direct current flowing over the calling subscriber line to assume the direction indicated by the broken arrows, Fig. 1, as explained above. However, due to the action of diode bridge 70 positive potential remains set up at the left-hand terminal and negative potential at the right-hand terminal of this bridge, diodes 73 and 72 being conductive in the instant case instead of diodes 74 and 71.

As mentioned above, hybrid coil 85 is coupled to the negative output terminal of diode bridge 70 through filter condenser 77, whereby direct current is kept from flowing through primary winding 86 of this coil; on the other hand negative bus bar —BB through which the transistor amplifiers are supplied with negative bias potentials is coupled to the aforementioned negative terminal by way of choke 75 and rheostat 76; another filter condensed 89 is connected directly across bus bars —BB and +BB. This arrangement prevents signal currents transmitted over the line in one or the other direction (as described below) from modulating the power supply voltage to the two transistor amplifiers. In this manner the danger of spurious oscillations being set up in the two voice amplifiers due to acoustic feedback between loudspeaker and microphone is greatly reduced. It should also be noted that diode bridge 70, in spite of its rectifying action, does not interfere with the transmission of signal currents thereover because the amplitude of the signal voltages is considerably smaller than that of the direct voltage impressed on the diode bridge; in other words, diode bridge 70 at all times remains conductive with respect to the transmission of signal currents regardless of the momentary direction of these currents.

All four transistors included in amplifiers 80 and 90 are used in a grounded emitter circuit. More particularly, emitters 162, 172, 182 and 192 are connected to bus bar +BB by way of emitter resistances 112, 120, 141/142 and 149 respectively. The four collectors 163, 173, 183 and 193 are supplied with negative bias potential from bus bar —BB through winding 116 of interstage coupling transformer 115 (in parallel with resistance 110), primary winding 126 of output transformer 125, resistance 137, and primary winding 146 of output transformer 145 respectively. The following voltage dividers are respectively provided for supplying the four bases 161, 171, 181 and 191 with an intermediate bias potential: a voltage divider comprising resistances 107, 108 and 109; a voltage devider comprising resistances 122 and 118; a voltage divider comprising resistances 134, 135 and 136; and a voltage divider comprising resistances 139 and 144.

Each of the above emitter resistances acts, in conjunction with the associated one of the foregoing voltage dividers, to provide a substantially constant-current bias supply to each base-emitter junction, namely by introducing inverse feedback of bias current in the well-known manner. For purposes of signal current transmission emitter resistances 112, 120 and 141 are by-passed by condensers 113, 119 and 143 respectively. Condenser 151 also acts as a by-pass condenser but this condenser is connected to negative bus bar —BB rather than positive bus bar +BB. In this manner the combination of resistance 149 and condenser 151 acts as a filter to reduce the coupling between the two amplifiers. A similar filter action is provided by resistance 107 and condenser 106 and by resistance 134 and condenser 133.

Resistance 110 is connected across the primary winding 116 of interstage coupling transformer 115 to lower the output impedance of the first stage of the transmitting amplifier and hence reduce linear distortion in the output stage of this amplifier. Condensers 121 and 148 are connected between collector and base of the output transistors, 170 and 190, respectively, of the two amplifiers in order to attenuate the higher audio frequencies; these condensers thus tend to equalize frequency response.

It will be noted that the receiving amplifier is quite similar to the transmitting amplifier, but the smaller gain required in the receiving amplifier makes it possible to use resistance coupling rather than transformer coupling between the two stages of this amplifier and also makes it possible to use some overall inverse feedback of signal current. In this connection attention is called to the series combination of resistances 140 and 142 which is connected across secondary winding 147 of output transformer 145, in parallel with loudspeaker 61.

In a representative loudspeaking system built according to the principles of the present invention the transmitting amplifier delivered an output power of 30 milliwatts at 5% distortion and provided a power gain of approximately 70 decibels for a 250 ohm load. The maximum output power of the receiving amplifier was approximately 30 milliwatts at 5% distortion and the power gain of this amplifier was about 40 decibels when operating into a 4.5 ohm load. The following is a list of the values of various resistors and condensers of this loudspeaking system which are of interest in connection with the filter action provided therein:

| | | |
|---|---|---|
| Rheostat 76 | ohms | 1,000 |
| Resistor 107 | do | 22,000 |
| Resistor 108 | do | 10,000 |
| Resistor 109 | do | 22,000 |
| Resistor 134 | do | 22,000 |
| Resistor 135 | do | 10,000 |
| Resistor 136 | do | 22,000 |
| Resistor 149 | do | 100 |
| Condenser 77 | microfarads | 10 |
| Condenser 89 | do | 200 |
| Condenser 106 | do | 2 |
| Condenser 133 | do | 2 |
| Condenser 151 | do | 50 |

Let us now revert to the description of the connection that has been completed by the subscriber at the substation, Figs. 1 and 2, with "on"-button 44 in its operated position. Outgoing signal voltages developed across the terminals of microphone 101 during conversation are impressed on potentiometer 104 and thence by way of coupling condenser 105 on the base-emitter path of transistor 160. Amplified signal currents flowing in the output circuit of this transistor by way of collector 163 and primary winding 116 of transformer 115 cause signal voltages to be induced in secondary winding 117 which, in turn, are impressed by way of condenser 111 on the base-emitter path of transistor 170. The amplified signal currents appearing in the output circuit of this transistor, which circuit includes collector 173 and primary winding 126 of transformer 125, give rise to the induction of signal voltages in secondary winding 127.

The last-mentioned signal voltages cause signal currents to flow over the following two paths: (1) upper terminal of winding 127, upper section of winding 86 of hybrid coil 85, condenser 77, diode 73, plug terminal T4, line conductor 13; and, after traversal of the central office equipment and the called subscriber's line and substation, back over line conductor 12, contacts 56 and 46, plug terminal T3, diode 72, lower terminal of winding 127. (2) Upper terminal of winding 127, lower section of winding 86 of hybrid coil 85, balancing resistance 88, lower terminal of winding 127. Under perfect conditions of balance the signal voltages induced in winding 87 by the two sections of winding 86 cancel each other so that no signal voltages are impressed on the input of receiving amplifier 90. In this manner howling of the loudspeaker system due to acoustic feedback between speaker and microphone is prevented.

Signal currents incoming over the line during conversation flow over the following path, Figs. 1 and 2: line conductor 12, contacts 56, 46, plug terminal T3, diode 72, resistance 88, both sections of winding 86 of the hybrid coil, condenser 77, diode 73, plug terminal T4, line conductor 13; a branch of this circuit, of course, extends over winding 127 which is connected across the lower section of winding 86 in series with resistance 88. The signal currents which flow through the two sections of windings 86 in series induce corresponding signal voltages in secondary winding 87 of the hybrid coil which are impressed on volume control potentiometer 131 and hence, via condenser 132, on the base-emitter path of transistor 180. The collector 183 of this transistor is coupled to the base 191 of transistor 190 by way of condenser 138. The amplified signal currents flowing in the output circuit including collector 193 of transistor 190 traverse primary winding 146 of transformer 145. Corresponding voltages are thus induced in secondary winding 147 and thence are impressed on loudspeaker 61, Fig. 1 by way of plug terminals T1, T2. As mentioned above, also connected across winding 147 is the series combination of resistances 140 and 142. Inasmuch as resistance 142 is in series with emitter 182 of first stage transistor 180, negative overall feedback of signal current is introduced in receiving amplifier 90, whereby the operation of this amplifier is stabilized.

If the calling subscriber now wishes to switch the telephone from loudspeaking operation to handset operation, for example to insure full privacy for some part of his conversation with the distant-party, he merely lifts the handset from the cradle. As described in detail above, this results, due to the interlock between control mechanism 230 and switchhook mechanism 210, in an automatic resetting of the control mechanism so that control buttons 44 and 45 return to their normal position and control contacts 40 are also restored to normal, see Fig. 6A. Thus by the mere removal of the handset from the cradle the telephone is placed, without interruption of the direct current line circuit, in the condition described above in connection with a call originated by the lifting of the handset. In particular, make-before-break contacts 43, 46 switch line conductor 12 from plug terminal T3 to induction coil 20, Fig. 1, namely by way of switchhook contact 43. The loudspeaking equipment, Fig. 2, is thus rendered ineffective both with respect to direct current and signal current. If the subscriber at any time during a call wishes to switch (or return) to loudspeaking operation he merely depresses "on"-button 44 and then replaces his handset. The loudspeaking equipment, Fig. 2, thus becomes again connected up by way of contact 46 and plug terminals T3 and T4.

Assuming now that the subscriber, with the system conditioned for loudspeaking operation as last explained, wishes to terminate the conversation he will depress "off"-button 45 momentarily. This action, as described above, resets control mechanism 230, thereby returning control contact assembly 40 to its normal condition. Since the handset is on the cradle and hence contact 33 open, the opening of control contact 46 interrupts the loop circuit and as a result the switching equipment in the central office returns to its normal condition.

In the above description of the operation of the telephone circuit, Figs. 1 and 2, it was assumed that the subscriber at this telephone was engaged in an outgoing call. If this telephone happens to be the called telephone, ringing current is projected from the connector switch over subscriber line 11 in the well-known manner, the ringing circuit being completed by way of line conductor 13, buzzer 52, hookswitch contact 31, control contact 41, condenser 58, line conductor 12. The party at the substation shown in Figs. 1 and 2 answers the call either by lifting the handset from the cradle or by depressing "on"-button 44. In either case the loop circuit is closed, namely at contact 33 or contact 46, as the case may be; when the ring cut-off relay, not shown, in the connector operates, called line 11 is switched through to back bridge relay 310 in the well-known manner so that the conversation between the calling and called subscribers may begin.

It will be noted that in this case the direction of the direct current flowing over the subscriber line during conversation is as indicated by the arrows shown in full lines in Fig. 1; that is, it is the same as it was in the above-described outgoing call prior to answering and opposite to what it was in that call during conversation. Due to rectifier bridge 70, Fig. 2, the polarity of the power supply to the transistor amplifiers is the same in all cases.

Reverting again to the plug-in connection of the circuit card 295, Fig. 5, this plug-in feature is an advantage in servicing because a good unit can be immediately substituted for a defective one and the latter can be replaced at a convenient time on the bench. In this connection it will be noted from Figs. 1 and 2 that even though the circuit card (Fig. 2) be removed, operation of the substation by means of the handset is in no manner interfered with.

While only certain embodiments of the invention have been illustrated and described it is to be understood that numerous modification in the details of arrangement may be resorted to without departing from the true spirit and scope of the invention as defined in the appended claims.

What is claimed is:

1. A telephone system comprsing a line, first and second transducer means, a handset housing said first transducer means, and a subset supporting said handset, said subset including a switchhook mechanism operated by said handset when resting on said subset and also including control means manually operable for switching said line from said first transducer means to said second transducer means and mechanical interlock means between said switchhook mechanism and said manual control means for restoring said manual control means when said switchhook mechanism is restored, whereby said line is automatically switched back to said first transducer means upon removal of the handset.

2. A loudspeaking telephone system comprising a line, a microphone and a microphone amplifier, a loudspeaker and a speaker amplifier, a handset housing a transmitter and receiver, and a subset supporting said handset, said subset including a swichhook mechanism operated by said handset when resting upon said subset and also including control means manually operable for switching said line from said transmitter and receiver to said microphone amplifier and speaker amplifier and mechanical interlock means between said switchhook mechanism and said manual control means for restoring said manual control means when said switchhook mechanism is restored, whereby said line is automatically switched to said transmitter and receiver upon removal of the handset.

3. A telephone system comprising a line, first and second transducer means, a handset housing said first transducer means, and a subset supporting said handset; said subset including a switchhook mechanism and a set of switchhook contacts governed thereby, said switchhook mechanism being operated by said handset when resting on said subset; and said subset also including a set of control contacts with an operate key and a reset key therefor, said control contacts being operated upon actuation of said operate key for switching said line from said first to said second transducer means, and being provided with a reset mechanism mechanically engaged both by said reset key and said switchhook mechanism for joint control thereby so that said control contacts are mechanically restored in actuation of said reset key and also in response to removal of the handset.

4. A loudspeaking telephone system comprising a line, distant-talking transducer means, amplifier means for said distant-talking transducer means, a handset housing close-range talking transducer means and a subset supporting said handset; said subset including a switchhook mechanism and a set of switchhook contacts governed thereby, said switchhook mechanism being operated by said handset when resting on said subset; and said subset also including a set of control contacts with an operate key and a reset key therefor, said control contacts being operated upon actuation of said operate key for switching said line from said close-range talking transducer means to said amplifier means, and being provided with a reset mechanism mechanically engaged both by said reset key and said switchhook mechanism for joint control thereby so that said control contacts are mechanically restored in response to actuation of said reset key and also in response to removal of the handset.

5. A loudspeaking telephone system as defined in claim 4, wherein said subset further includes resilient means through the medium of which said reset mechanism is mechanically coupled with said switchhook mechanism.

6. A telephone system comprising a line, first and second transducer means, a handset housing said first transducer means and a subset having a cradle portion supporting said handset; said subset including a switchhook mechanism and a set of switchhook contacts governed thereby, said switchhook mechanism being operated by said handset when resting on said cradle portion; and said subset also including a set of control contacts with an operate key and a reset key therefor, said keys being mounted immediately in front of said cradle portion, said control contacts being operated upon actuation of said operate key for switching said line from said first to said second transducer means, and being provided with a reset mechanism mechanically engaged both by said reset key and said switchhook mechanism for joint control thereby so that said control contacts are mechanically restored in response to actuation of said reset key and also in response to removal of the handset.

7. In combination, a subscriber line, loudspeaking telephone apparatus connected to said line; said apparatus including a subset having a base and also including a buzzer connected to said line for the receipt of ringing current transmitted thereover, transducer means, transistor amplifier means connected between said line and said transducer means for amplifying voice-frequencies transmitted over said line, a plug-in type circuit card mounting said amplifier means, and a connector receiving said circuit card, said buzzer as well as said connector with said card plugged into it being mounted on the base of said subset.

8. A telephone system comprising a central office battery, a subscriber line and loudspeaking apparatus connected to said line; said apparatus including a subset having a base and also including a buzzer connected to said line for the receipt of ringing current transmitted thereover, a hybrid coil connected to said line, a microphone, a loud speaker, two voice-frequency transistor amplifiers respectively interposed between said microphone and said coil and between said coil and said loudspeaker, power supply means connected to said line for supplying said amplifiers with bias potentials from said central battery, and a circuit card mounting said amplifiers, said hybrid coil and said power supply means, said buzzer as well as said circuit card being mounted on the base of said subset.

9. In a telephone system, a central office battery, a line, loudspeaking apparatus connected to said line, said apparatus comprising a microphone, a loudspeaker, a transistor amplifier for said microphone, a transistor amplifier for said loudspeaker and power supply means for supplying said amplifiers with direct current bias potentials from said battery over said line, said means including a rectifier bridge, the input of which is connected to said line, for maintaining the bias supply to both said amplifiers at a predetermined polarity regardless of the polarity with which said central battery is connected to said line, and including a filter having an input connected to the rectified output of said bridge and having a direct bias current output and an alternating signal current output, said amplifiers having two sets of terminals for coupling said amplifiers to said line with respect to bias currents and signal currents respectively, said two sets of terminals being respectively connected to the bias current output and the signal current output of said filter.

10. In a telephone system, a central office battery, a line, loudspeaking apparatus connected to said line, said apparatus comprising a microphone, a loudspeaker, a transistor amplifier for said loudspeaker, a hybrid coil, and power supply means for supplying said amplifiers with direct current bias potentials from said battery over said line, said means including a rectifier bridge, the input of which is connected to said line, for maintaining the bias supply to both said amplifiers at a predetermined polarity regardless of the polarity with which said central battery is connected to said line, and including a filter connected to the rectified output of said bridge and comprising an inductance and capacitance, said amplifiers having a direct-current input for coupling them to said line with respect to bias currents and said amplifiers being connected to said hybrid coil for coupling them to said line with respect to signal currents, said direct-current input and said hybrid coil being connected to the output of said bridge in series with said inductance and capacitance respectively.

11. In a telephone system, the combination as claimed in claim 10, wherein the direct-current input of said amplifiers is connected to the output of said bridge through said inductance and a variable resistance in series.

References Cited in the file of this patent

UNITED STATES PATENTS

| | | |
|---|---|---|
| 1,956,360 | Obergfell | Apr. 24, 1934 |
| 2,785,231 | Chase | Mar. 12, 1957 |
| 2,786,099 | Beatty | Mar. 19, 1957 |
| 2,801,287 | Clemency | July 30, 1957 |